May 9, 1950     W. R. CUSENBARY     2,506,662
TREE GRUBBER
Filed Aug. 28, 1945

Inventor
WILLIAM R. CUSENBARY,

Patented May 9, 1950

2,506,662

UNITED STATES PATENT OFFICE 2,506,662

TREE GRUBBER

William R. Cusenbary, Sonora, Tex.

Application August 28, 1945, Serial No. 613,133

3 Claims. (Cl. 37—2)

My invention relates to a tree grubber, and particularly to a tree grubber which is of the power driven leverage type.

The primary object of the invention is to provide a tree grubber which will work into the ground by a movement back and forth similar to that given to a spade or fork in the working of garden soil; which will sever the tap root below the crown of the tree; and which, after the severing of the tap root below the crown, will heave the crown up carrying with it the severed tap root and adjacent small roots.

Another object of my invention is to provide a tree grubber which is relatively simple in design, durable inconstruction, efficient in use, and inexpensive to manufacture.

Other objects of my invention will appear hereinafter.

The accompanying drawing illustrates a preferred embodiment of my invention.

Figure 1:
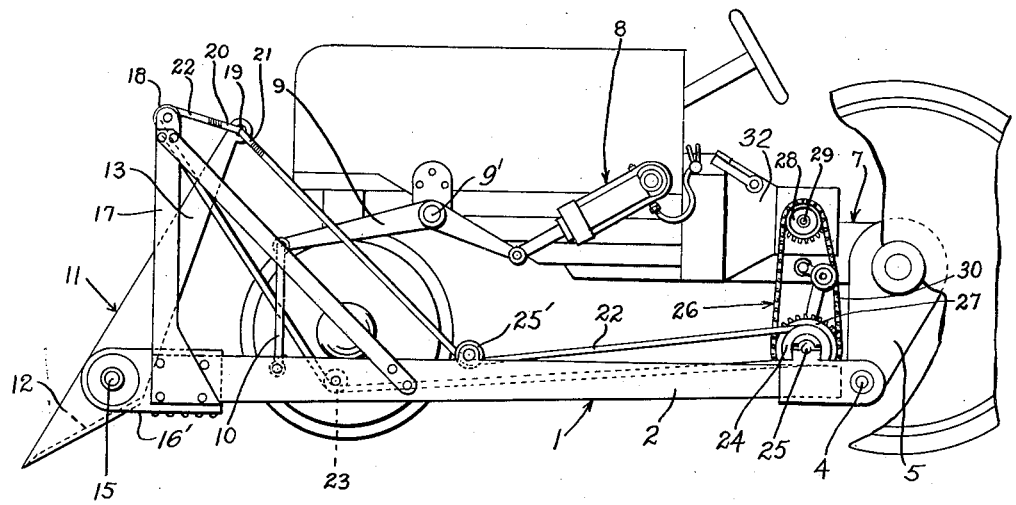
Figure 1 is a side elevational view of my improved tree grubber.
Figure 2:
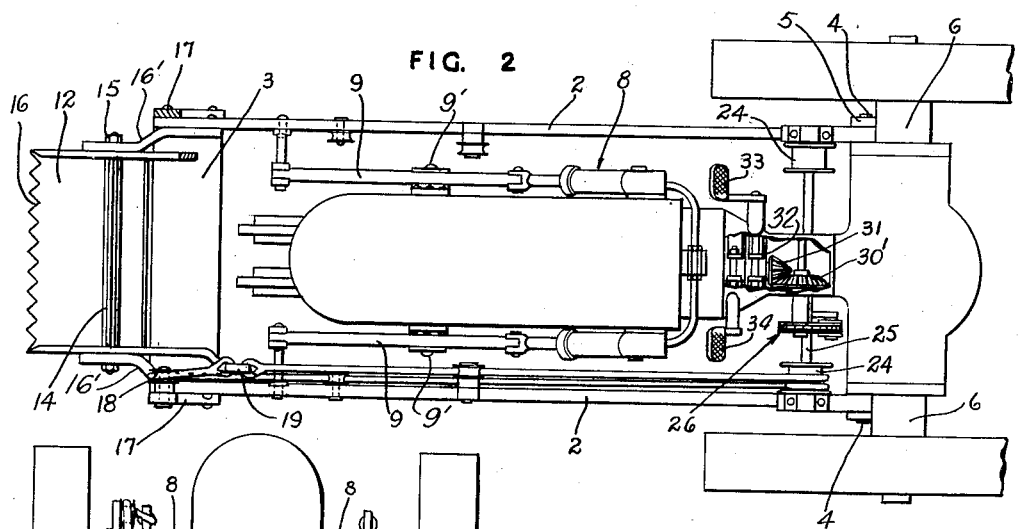
Figure 2 is a top plan view thereof, certain parts being broken away.
Figure 3:
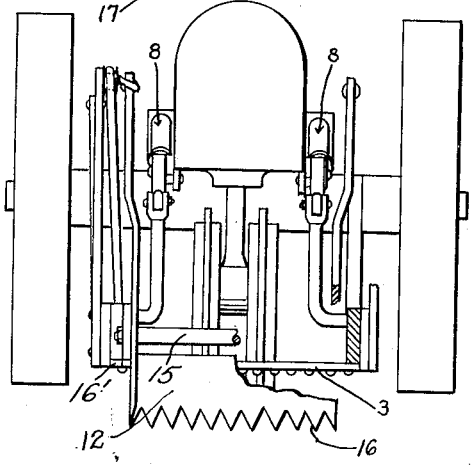
Figure 3 is a front view thereof, certain parts being broken away and certain parts being in section.

Referring now in detail to the drawing:

Construction

The tree grubber of this invention includes a frame 1 comprising two parallel beams 2 connected at their forward ends by a cross bar 3. The frame is pivotally connected at the rear or inner ends of the beams 2 through shafts 4 on the lower ends of arms 5 depending from an axle housing 6 of a tractor 7.

A conventional hydraulic lift 8 of the tractor 7 has bell-crank levers 9 thereof pivoted at 9' to the tractor 7 and connected to the forward ends of the beams 2 by links 10 so that the hydraulic lift can be employed for raising and lowering the frame 1 with respect to the ground.

A grubbing implement 11 comprises a bit 12 and arms 13 to the lower ends of which the bit 12 is secured. The arms 13 are connected adjacent their lower ends by a bar 14 whose outer ends are pivotally mounted at 15 on short bars 16' securely attached to the outer ends of the beams 2. The bit 12 has a serrated cutting edge 16.

Upstanding standards 17 are mounted on the ends of the beams 2 which are connected by the bar 3. The upper ends of the standards 17 each carry a pulley 18. The upper end of each arm 13 has an eye 19 through which are secured oppositely arranged ends 20 and 21 of a cable 22.

Each cable 22 extends from its end 20 over the pulley 18 and downwardly under a guide pulley 23 mounted on the corresponding beam 2, and from thence around a drum 24, and then back under a guide pulley 25' and to the end 21 secured to the eye 19, as shown in Figure 1. The drums 24 are mounted on a shaft 25 carried by the beams 2.

A sprocket gearing of conventional design, indicated generally by the character 26, and including a sprocket wheel 27 on the shaft 25, a sprocket wheel 28 on the shaft 29, and a sprocket chain 30 passing over the sprocket wheels 27 and 28, connects the shaft 25 with the shaft 29.

Upon the shaft 29 there is mounted a bevel gear 30 with which a bevel pinion 31 meshes. The bevel pinion 31 is connected with a planetary gearing 32 by which the pinion 31 may be turned in reverse directions by the pedal 33 or by the pedal 34. The planetary gearing forms a part of the standard transmission of the tractor so as to obtain power therefrom.

Operation

In the operation of my tree grubber, the tractor is placed at a proper distance from the tree or stump to be removed from the ground. The bit 12 is then dropped down to the ground by lowering the frame 1 through the operation of the hydraulic lift 8. After the bit touches the ground at the proper distance from the tree to be removed, it is adjusted at the proper angle to the ground by means of pulling the arms 13 backward or forward through the medium of the cable 22, which is moved through the medium of the drum 24 when rotated by power applied from the planetary gearing 32, the direction of pull being determined by the operator pushing either the pedal 33 or the pedal 34.

The bit 12 sinks into the ground in the same manner as a garden fork or spade. To aid the bit in penetrating the ground it is shaken back and forth against the sides of the opening which it is creating in much the same way as a gardener pries up and then down to a slight extent on the handle to move the soil away and thus make it easier for the spade to move forward. This prying movement of the bit 12 is produced by alternately pressing the foot pedals 33 and 34 to a slight extent.

As the bit 12 is being sunk into the ground, the front end of the frame 1 is correspondingly lowered by means of the hydraulic lift. The bit is sunk into the ground until the forward end of the frame 1 rests upon the ground. Near the end of the ground penetration action of the bit, the arm 13 is pulled all the way back, and in this way the edge 16 of the bit is caused to cut the tap root below the crown or main clump of roots joining the tree trunk.

A heaving action is now employed to raise the clump of roots, including the upper severed part of the tap root, and adjoining small feed roots, together with the tree trunk, or stump, as the case may be, out of the ground. This is accomplished by a lifting action of the front end of frame 1, actuated by the hydraulic lift. During this heaving action it sometimes is necessary to drop the frame slightly and push the bit forward more so as to be completely under the clump of roots, and sever small roots on the opposite side of the clump.

It will be understood that the herein disclosed embodiment of my invention is merely illustrative, and that modifications thereof are possible within the scope of the appended claims.

I claim:

1. A power attachment for a tractor having power-operating means comprising a U-shaped structural frame, means pivotally attaching the open ends of said frame to the tractor at a point associated with the axle of the driving wheels thereof, means adjustably supporting the closed end of said frame from the tractor, power means associated with said supporting means for raising and lowering the closed end of said frame, a grubber with upwardly extending arms, means pivotally mounting said grubber on said frame at the closed end of the latter at a point relatively close to and spaced from the grubbing edge thereof, posts extending upwardly at opposite corners of the closed end of said frame associated with the upwardly extending arms of the grubber, a pulley on the ends of each of said posts, a pair of rotatable drums operatively connected to said power-operating means of the tractor, and a cable trained over each of said pulleys and one of said drums and having its ends connected to the extreme ends of one of said arms.

2. A tree grubbing attachment for a tractor comprising a frame including two side beams disposed one at each side of the tractor and pivotally connected at their rear ends to said tractor adjacent the rear end of the latter, a bar extending transversely between and secured to said beams at the front ends thereof and respective standards secured at their lower ends to said beams near the front ends of the latter and upstanding therefrom, a pulley journaled in the upper end of each standard, a pair of spaced-apart arms disposed between and pivotally connected intermediate their length to the front ends of said beams, each of said arms having in its upper end an eye disposed adjacent the associated standard-carried pulley, a bit extending between and secured at its ends to the lower ends of said arms, hydraulic means inter-connected between the tractor and said beams to raise and lower the front end of said frame, a drum journaled on each of said beams, respective cables each connected at its ends to the eye of the corresponding arm, carried over the corresponding standard-carried pulley and wound intermediate its length on the corresponding drum, means drivingly connecting the tractor to the drums, and manually-operated reversing means interposed in said connecting means for selective operation of said drums in opposite directions to rock said arms and said bit.

3. A tree grubbing attachment for a tractor comprising a frame extending along the sides and across the front of the tractor, means pivotally connecting the rear end of the frame to the tractor near the rear end of the latter, manually-controlled hydraulic means inter-connected between the tractor and said frame for raising and lowering the front end of the frame, a pair of spaced-apart arms pivotally mounted intermediate their length on the front end of said frame, a bit extending between and secured at its ends to the lower ends of said arms, a pair of spaced-apart standards upstanding from the front end of said frame, respective pulleys journaled on the upper ends of said standards, respective drums journaled on the sides of said frame, respective cables wound on said drums connected to the upper ends of the corresponding arms and carried over the corresponding pulleys, and manually-reversible means driven by said tractor and drivingly connected to said drums to rock said arms and said bit.

WILLIAM R. CUSENBARY.

REFERENCES CITED

The following references are of record in the file of this patent:

UNITED STATES PATENTS

| Number | Name | Date |
| --- | --- | --- |
| 1,085,035 | Greimann | Jan. 20, 1914 |
| 1,385,322 | Hoffmeyer | July 19, 1921 |
| 2,044,624 | Morgan | June 16, 1936 |
| 2,173,406 | Wilkinson | Sept. 19, 1939 |
| 2,187,707 | Kane | Jan. 16, 1940 |
| 2,295,458 | Edwards | Sept. 8, 1942 |
| 2,303,415 | Williams | Dec. 1, 1942 |
| 2,323,434 | Williams | July 6, 1943 |
| 2,332,561 | Drott | Oct. 26, 1943 |